US011388116B2

(12) United States Patent
Kwatra et al.

(10) Patent No.: US 11,388,116 B2
(45) Date of Patent: Jul. 12, 2022

(54) AUGMENTED REALITY ENABLED COMMUNICATION RESPONSE

(71) Applicant: INTERNATIONAL BUSINESS MACHINES CORPORATION, Armonk, NY (US)

(72) Inventors: Shikhar Kwatra, Raleigh, NC (US); Raghuveer Prasad Nagar, Kota (IN); Sarbajit K. Rakshit, Kolkata (IN); Nadiya Kochura, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/944,302

(22) Filed: Jul. 31, 2020

(65) Prior Publication Data
US 2022/0038396 A1  Feb. 3, 2022

(51) Int. Cl.
*H04L 51/02* (2022.01)
*G06N 20/00* (2019.01)
(Continued)

(52) U.S. Cl.
CPC ............ *H04L 51/02* (2013.01); *G06N 20/00* (2019.01); *H04M 1/7243* (2021.01); *H04M 1/72409* (2021.01)

(58) Field of Classification Search
CPC ............ G06N 20/00; G06N 3/08; G06N 5/04; G06N 3/0454; G06N 5/022; G06N 20/10; G06N 3/006; G06N 3/04; G06N 3/0445; G06N 5/003; G06N 5/02; G06N 5/027; G06N 7/005; G06N 7/023; G06F 16/9535; G06F 16/24575; G06F 16/24578; G06F 40/205; G06F 40/30; G06F 16/2365; G06F 16/248; G06F 16/3322; G06F 16/3329; G06F 16/90332; G06F 16/951;
(Continued)

(56) References Cited

U.S. PATENT DOCUMENTS 9,218,819 B1 * 12/2015 Stekkelpak ............. G10L 15/22
2013/0063487 A1    3/2013 Spiegel
(Continued)

FOREIGN PATENT DOCUMENTS

| WO | 2016077493 A1 | 5/2016 |
| WO | 2018112445 A1 | 6/2018 |
| WO | 2019055703 A2 | 3/2019 |

OTHER PUBLICATIONS

Disclosed Anonymously, "System and Method for Collaborative Third-Party Assisted Augmented Reality," IP.Com, IP.Com Disclosure No. IPCOM000240783D, https://priorart.ip.com/IPCOM/000240783, Feb. 28, 2015, pp. 1-3.
(Continued)

*Primary Examiner* — Golam Sorowar
(74) *Attorney, Agent, or Firm* — Lily Neff (57) ABSTRACT

The exemplary embodiments disclose a method, a computer program product, and a computer system for responding to communications based on context. The exemplary embodiments may include a user receiving a contextual communication, collecting data relating to an environment of the user, extracting one or more features from the collected data, and generating one or more responses to the received contextual communication based on the extracted one or more features and one or more models.

20 Claims, 5 Drawing Sheets

(51) Int. Cl.
H04M 1/7243 (2021.01)
H04M 1/72409 (2021.01)

(58) Field of Classification Search
CPC ............. G06F 16/9532; G06F 16/9538; G06F 3/0237; G06F 40/274; G06F 40/40; G06F 16/176; G06F 16/178; G06F 16/2255; G06F 16/243; G06F 16/24552; G06F 16/285; G10L 15/1815; G10L 15/07; G10L 15/22; G10L 15/26; G10L 2015/223; G10L 13/00; G10L 13/04; G10L 13/08; G10L 15/00; G10L 15/02; G10L 15/063; G10L 15/16; G10L 15/1807; G06Q 10/10; G06Q 10/1095; G06Q 30/0246; G06Q 10/00; G06Q 10/02; G06Q 10/04; G06Q 10/06; G06Q 10/0631; G06Q 10/06311; G06Q 10/109; G06Q 10/1097

See application file for complete search history.

(56) References Cited

U.S. PATENT DOCUMENTS

| | | |
|---|---|---|
| 2013/0077833 A1 | 3/2013 | Kritt |
| 2015/0213650 A1 | 7/2015 | Barzuza |
| 2016/0093108 A1 | 3/2016 | Mao |
| 2016/0203123 A1* | 7/2016 | Kozloski ............... G06F 40/30 704/224 |
| 2016/0203641 A1 | 7/2016 | Bostick |
| 2016/0364382 A1* | 12/2016 | Sarikaya ............... G06F 40/253 |
| 2017/0115742 A1 | 4/2017 | Xing |
| 2017/0220863 A1 | 8/2017 | Lection |
| 2018/0082476 A1 | 3/2018 | Kline |
| 2018/0130194 A1 | 5/2018 | Kochura |
| 2018/0352300 A1 | 12/2018 | Kline |

OTHER PUBLICATIONS https://www.marketsandmarkets.com/Market-Reports/mobile-augmented-reality-market-174800140.html"Mobile Augmented Reality Market," Markets and markets.com, May 2016, pp. 1-8.

Kahney, "Your Smartphone Is Ready To Take Augmented Reality Mainstream," Wired, https://www.wired.co.uk/article/augmented-reality-breakthrough-2018, Jan. 4, 2018, pp. 1-6.

Mell et al., "The NIST Definition of Cloud Computing", National Institute of Standards and Technology, Special Publication 800-145, Sep. 2011, pp. 1-7.

Statt, "Vuzix Blade AR Glasses Are the Next-Gen Google Glass We've All Been Waiting For," The Verge, https://vww.theverge.eom/2018/1/9/16869174/vuzix-blade-ar-glasses-augmented-reality-amazon-alexa-ai-ces-2018, Jan. 9, 2018, pp. 1-7.

* cited by examiner

AUGMENTED REALITY ENABLED COMMUNICATION RESPONSE

BACKGROUND

The exemplary embodiments relate generally to augmented reality, and more particularly to using augmented reality to dynamically respond to communications based on context.

Many people may wish to communicate with others via smart devices without using their hands to pick up the smart device. In certain contexts, it may be perceived as rude for someone to pick up and engage with a smart device. For example, an individual may be perceived as disrespectful for interacting with their smartphone while at a dinner, social party, or event.

SUMMARY

The exemplary embodiments disclose a method, a computer program product, and a computer system for responding to communications based on context. The exemplary embodiments may include a user receiving a contextual communication, collecting data relating to an environment of the user, extracting one or more features from the collected data, and generating one or more responses to the received contextual communication based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people may wish to communicate with others via smart devices without using their hands to pick up the smart device. In certain contexts, it may be perceived as rude for someone to pick up and engage with a smart device. For example, an individual may be perceived as disrespectful for interacting with their smartphone while at a dinner, social party, or event.

Exemplary embodiments are directed to a method, computer program product, and computer system for responding to communications based on context. In embodiments, machine learning may be used to create models capable of responding to communications based on context, while feedback loops may improve upon such models. Moreover, data from user uploads, databases, or the sensors 112 may be used to respond to communications based on context. In embodiments, contextual communications may refer to any question or implicit question relating to a user's physical surroundings. A user may wish to answer contextual communications without physically interacting with a handheld smart device in a number of circumstances. For example, a user may receive a text message asking if a pizza has been delivered to a party yet, and the user may wish not to answer the text message via their handheld smartphone for fear of being perceived as rude or disrespectful to others at the party. In another example, a user may be driving a vehicle and may receive an email asking if the user is on their way to lunch yet. The user may wish not to answer the email via their handheld smartphone because of the dangers of doing so while driving the vehicle. In general, it will be appreciated that embodiments described herein may relate to aiding in the response to any contextual communications within any environment and for any motivation.

Figure 1:
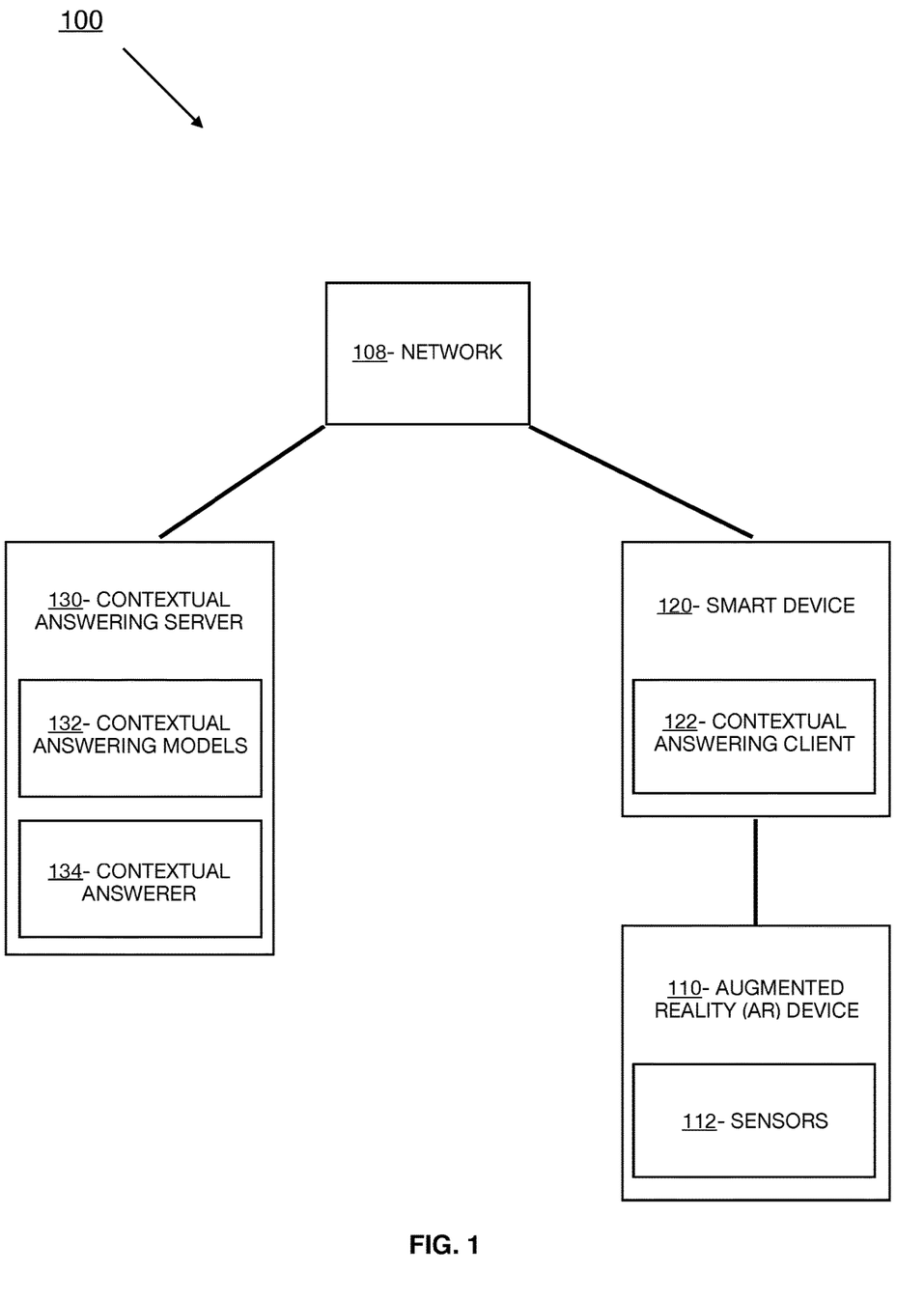
FIG. 1 depicts an exemplary schematic diagram of a contextual answering system 100, in accordance with the exemplary embodiments.

FIG. 1 depicts the contextual answering system 100, in accordance with the exemplary embodiments. According to the exemplary embodiments, the contextual answering system 100 may include one or more augmented reality (AR)

devices 110, a smart device 120, and a contextual answering server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the contextual answering system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the AR device 110 may be a wearable device capable of overlaying/superimposing computer-generated images upon a user's view of a real-world scene. In embodiments, the AR device 110 may include one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the AR device 110 is shown as a single device, in other embodiments, the AR device 110 may be comprised of a cluster or plurality of computing devices, in a modular manner, etc., working together or working independently. The AR device 110 is described in greater detail as a hardware implementation with reference to FIG. 3, as part of a cloud implementation with reference to FIG. 4, and/or as utilizing functional abstraction layers for processing with reference to FIG. 5.

In example embodiments, the sensors 112 may comprise a camera, microphone, light sensor, infrared sensor, movement detection sensor, pressure detection sensor, smell sensor, thermometer, speedometer, accelerometer, gyroscope, global positioning system (GPS) sensor, heart rate monitor, or other sensory hardware equipment. Moreover, the AR device 110 may incorporate an array of the one or more sensors 112 such that information can be obtained by the sensors 112 in multiple directions, at different times/intervals, in different mediums/frequencies, and the like. For example, the AR device 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation.

While the sensors 112 are depicted as integrated with the AR device 110, in embodiments, the sensors 112 may be incorporated within an environment in which the contextual answering system 100 is implemented. For example, the sensors 112 may be one or more microphones built into an auditorium, a camera built into a facility, a smell sensor, speedometer, accelerometer, spectrometer, thermometer, pedometer, etc. Moreover, data processing techniques may be implemented such that directional information of visual and audio data can be obtained based on signals received by each of the sensors 112, such as trilateration and triangulation. In other embodiments, the sensors 112 may be integrated with other smart devices, e.g., smart phones and laptops, within an environment implementing the contextual answering system 100. In such embodiments, the sensors 112 may communicate directly with other networks and devices, such as the network 108. The sensors 112 are described in greater detail as a hardware implementation with reference to FIG. 3, as part of a cloud implementation with reference to FIG. 4, and/or as utilizing functional abstraction layers for processing with reference to FIG. 5.

In the example embodiment, the smart device 120 includes a contextual answering client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The contextual answering client 122 may act as a client in a client-server relationship. The contextual answering client 122 may also be a software and/or hardware application capable of communicating with and providing a user interface for a user to interact with a server, for example the contextual answering server 130, via the network 108. Moreover, in the example embodiment, the contextual answering client 122 may be capable of transferring data from the AR device 110 and/or the sensors 112 between the smart device 120 and other devices via the network 108. In embodiments, the contextual answering client 122 utilizes various wired and wireless connection protocols for data transmission and exchange, including Bluetooth, 2.4 gHz and 5 gHz internet, near-field communication, Z-Wave, Zigbee, etc. The contextual answering client 122 is described in greater detail with respect to FIG. 2.

In the exemplary embodiments, the contextual answering server 130 may include one or more contextual answering models 132 and a contextual answering program 134, and may act as a server in a client-server relationship with the contextual answering client 122. The contextual answering server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the contextual answering server 130 is shown as a single device, in other embodiments, the contextual answering server 130 may be comprised of a cluster or plurality of computing devices, working together or working independently. The contextual answering server 130 is described in greater detail as a hardware implementation with reference to FIG. 3, as part of a cloud implementation with reference to FIG. 4, and/or as utilizing functional abstraction layers for processing with reference to FIG. 5.

The contextual answering models 132 may be one or more algorithms modelling a correlation between one or more features detected by the sensors 112 and one or more responses to contextual communications. In the example embodiment, the contextual answering models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of the one or more features being indicative of an appropriate response to contextual communications. In embodiments, such features may relate to the context of a user, for example people, animals, objects, locations, activities, actions, motions, discussion topics, discussion tones, temperatures, speeds, accelerations, scents, etc. The contextual answering models 132 may weight the features based on an effect that the features have on a response to various contextual communications.

In the exemplary embodiments, the contextual answering program 134 may be a software and/or hardware program capable of collecting training data, extracting features from the training data, and training one or more models based on the extracted features. The contextual answering program 134 may additionally be capable of configuring a session and detecting an incoming contextual communication. The contextual answering program 134 may be further configured for collecting contextual data, extracting features from the collected data, and applying one or more models to the extracted features to generate one or more responses to the contextual communication. Moreover, the contextual answering program 134 may be further configured for notifying the user of the one or more responses. The contextual answering program 134 is additionally capable of evaluating whether the one or more responses were accurate and/or sent by the user in response to the communication, and adjusting the one or more models. The contextual answering program 134 is described in greater detail with reference to FIG. 2.

Figure 2:
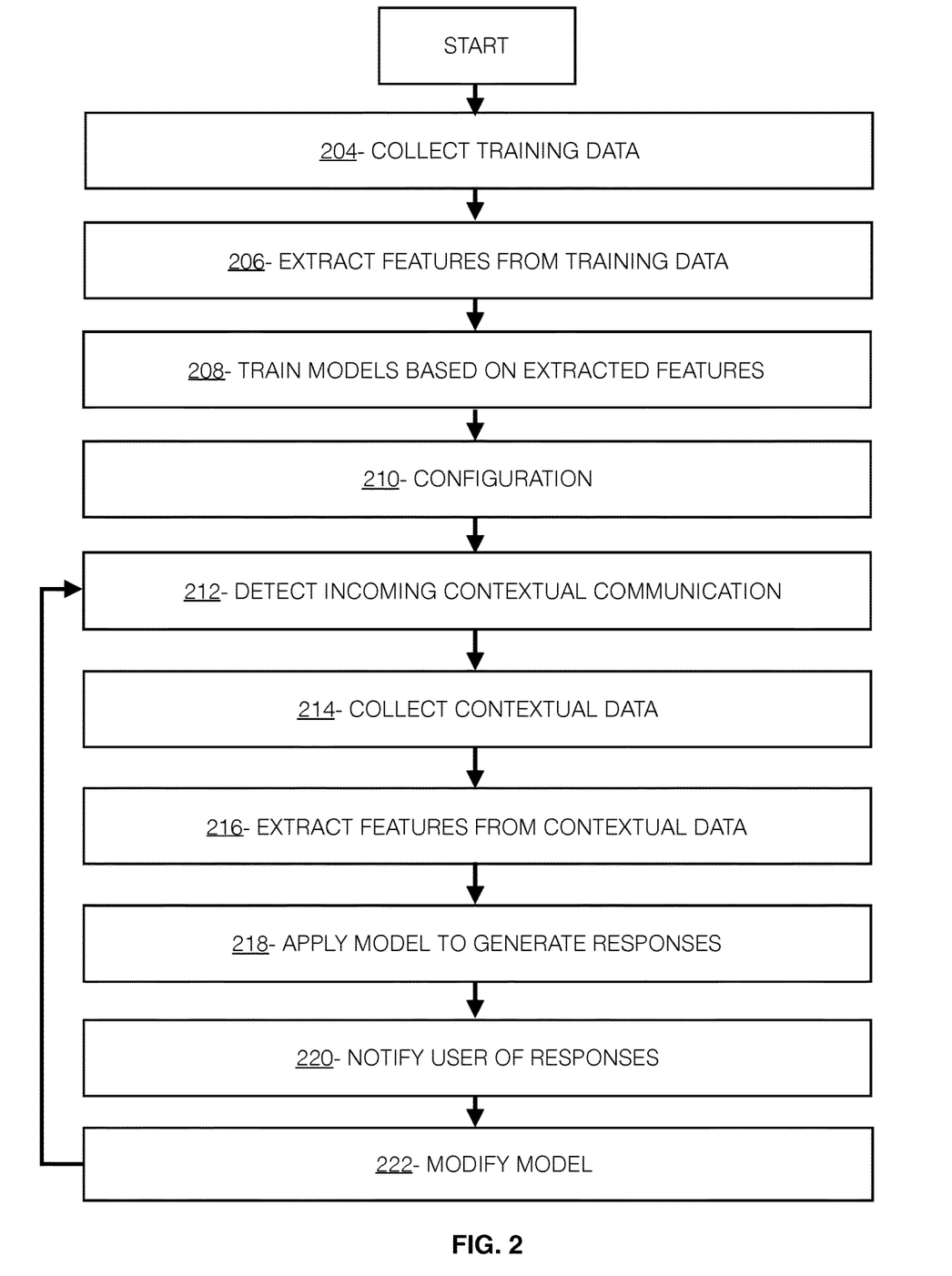
FIG. 2 depicts an exemplary flowchart illustrating the operations of a contextual answering program 134 of the contextual answering system 100 in responding to a contextual communication, in accordance with the exemplary embodiments.

FIG. 2 depicts an exemplary flowchart illustrating the operations of a contextual answering program 134 of the contextual answering system 100 in responding to communications based on context, in accordance with the exemplary embodiments. In exemplary embodiments, the contextual answering program 134 first implements a training phase in which it trains the contextual answering models 132 using training data from previous responses to contextual communications. The contextual answering program 134 then moves on to an operational phase in which it applies the trained contextual answering models 132 to current contextual communications in order to appropriately respond to the contextual communications.

The contextual answering program 134 may collect and/or receive training data (step 204). In embodiments, the training data may be sourced from one or more previous responses to contextual communications. Training data may include previously received contextual communications, a user's responses to those previously received contextual communications, and data of a user's contextual environment while responding to those previously received contextual communications. For example, training data may include the previously received message, "Is Ryan there yet?", the user's response to the message, "Yes, Ryan is here," and data from microphones and video cameras built into the user's AR device 110. The contextual answering program 134 may retrieve training data via user upload, databases, or the sensors 112. The contextual answering program 134 may retrieve training data such as calendar data, social media data, message history data, etc. via user upload or one or more databases. In embodiments, the contextual answering program 134 may collect training data via the sensors 112 as one or more microphones built into an auditorium, a camera built into a facility, a smell sensor built into the AR device 110, etc. The collected training data may be related to one or more people, animals, objects, locations, activities, actions, motions, discussion topics, tones, temperatures, speeds, accelerations, scents, etc. of a user's contextual environment.

To further illustrate the operations of the contextual answering program 134, reference is now made to an illustrative example where the contextual answering program 134 collects training data of previous responses to contextual communications. For each previous response, the contextual answering program 134 collects the incoming contextual communication requiring a response, a user's response to the incoming contextual communication, and data of a user's contextual environment while responding to the incoming contextual communications.

The contextual answering program 134 may extract one or more features from the collected and/or received training data (step 206). The extracted features may be extracted from the audio, video, smell, temperature, etc. data and/or databases, and may include features related to the contextual environment of a user such as present people, animals, objects, locations, activities, actions, motions, discussion topics, discussion tones, temperatures, speeds, accelerations, scents, etc. In embodiments, the contextual answering program 134 may use techniques such as feature extraction, natural language processing, optical character recognition, image processing, named entity recognition, audio processing, pattern/template matching, data comparison, convolutional neural networks, Mel frequency cepstral coefficient based extraction, etc. to identify entity features such as people, animals, objects, and locations of a user's contextual environment. For example, the contextual answering program 134 may compare collected audio and video from microphones and video cameras with images, videos, and audio of a user's social network account to identify people around the user. The contextual answering program 134 may utilize optical character recognition to determine that a sign says, "pig stables," and may extract a pig scent from smell data to determine that a pig is near the user. In addition, the contextual answering program 134 may utilize image processing to identify a pizza, and further extract that the pizza is hot from collected video showing steam coming from the pizza and collected temperature data of thermometers. The contextual answering program 134 may further extract a location of a user from GPS data of GPS sensors, and additionally via optical character recognition, image processing, audio processing, etc. For example, if collected video shows a street sign saying "W 34$^{th}$ Street" and collected audio catches a person near the user saying, "Wow, the empire state building is so tall," the contextual answering program 134 may extract the user's location as the address of the empire state building.

In addition to extracting features such as people, animals, objects, locations, etc., the contextual answering program 134 may also extract activities, actions, motions, speeds, accelerations, etc. of a user's context from the collected training data (step 206 continued). In embodiments, the contextual answering program 134 may use techniques such as feature extraction, natural language processing, optical character recognition, image processing, facial recognition, audio processing, pattern/template matching, data comparison, etc. to identify activities, actions, motion, speeds, accelerations, etc. of a user's contextual environment. For example, if video is collected of two cards lying on a table in front of each person sitting around the table, with one card lying face up and one card lying face down, and audio is collected of a user saying, "Hit," the contextual answering program 134 may determine that the user and other people around the user are playing blackjack. If speedometers show that a user is traveling at 20 mph and collected video shows the user's friend biking directly in front of the user's field of vision, the contextual answering program 134 may determine that the user is biking. The contextual answering program 134 may further reference a user' calendar to extract activities. For example, if a user has "tennis match" scheduled in their calendar, the contextual answering program 134 may extract activity "playing tennis" for the user at that scheduled time. The contextual answering program 134 may similarly extract any activities, actions, motions, etc. that a user or others around the user may be engaged in.

In addition to extracting features such as activities, actions, motions, speeds, accelerations, etc., the contextual answering program 134 may also extract discussion topics and tones of a user's context from the collected training data (step 206 continued). In embodiments, the contextual answering program 134 may use techniques such as natural language processing, feature extraction, topic modelling, audio processing, pattern/template matching, data comparison, etc. to identify discussion topics and tones of a user's contextual environment. For example, if microphones collect a user's friend asking the user, "What did you think of last Thursday's meeting?", the contextual answering program 134 may reference the user's calendar to determine that the user's friend is asking about an interview of a candidate that took place the previous Thursday. Additionally, if the user was engaged in multiple meetings the previous Thursday, the contextual answering program 134 may cross reference participants at those meetings to determine which meeting the user's friend is referring to. If microphones collect a person near a user saying, "Congratulation, that's amazing!" the contextual answering program 134 may extract excitement, and if the microphones collect a person yelling, "Oh c'mon, you've got to be kidding me!" the contextual answering program 134 may extract frustration and/or disappointment. The contextual answering program 134 may similarly extract any discussion topics and tones of speech of a user's contextual environment.

Lastly, the contextual answering program 134 collects the user's response to the contextual communication (206 continued). User responses to the contextual communications may be sourced from, for example, the messaging history of the user, social media platform, etc.

With reference to the previously introduced example where the contextual answering program 134 collects training data of previous responses to contextual communications, the contextual answering program 134 extracts features such as people, animals, objects, locations, activities, actions, motions, discussion topics, discussion tones, temperatures, speeds, accelerations, and scents from the collected training data with respect to each previously received contextual communication and associated user response.

The contextual answering program 134 may train one or more contextual answering models 132 based on the extracted features (step 208). The contextual answering program 134 may train one or more contextual answering models 132 based on an association of the one or more extracted features with a user's response to previous contextual communication. As previously mentioned, such extracted features may include people, animals, objects, locations, activities, actions, motions, discussion topics, tones, temperatures, speeds, accelerations, and scents of a user's contextual environment, and the one or more contextual answering models 132 may be generated through machine learning techniques such as neural networks. Moreover, the contextual answering program 134 may train the one or more contextual answering models 132 to weight the features such that features shown to have a greater correlation with an appropriate response to contextual communications are weighted greater than those features that are not. In embodiments, the contextual answering models 132 may include a model for each user. In other embodiments, the contextual answering models 132 may include a model for each type of contextual communication, for example one model for contextual communication asking about people, animals, objects, etc. that are present near the user, one for questions about one or more locations of the user, one for questions about activities, actions, motions, speeds, accelerations, etc. of the user, one for discussion topics and tones of conversations involving the user or taking place near the user, and one for temperatures and scents of the user's environment. In these embodiments, the contextual answering program 134 may utilize natural language processing to determine what a previously received contextual communication was asking about, and train one or more contextual answering models 132 specific to what was asked about. In embodiments where multiple contextual answering models 132 are trained, more than one contextual answering model 132 may be applied to a contextual communication that asks or implies more than one question (i.e. compound questions). In other embodiments, the contextual answering program 134 may simply train one contextual answering model 132 to be later applied for all types of incoming contextual communications. Based on the contextual answering models 132's extracted features and weights associated with such extracted features, the contextual answering program 134 may later generate one or more responses to incoming contextual communications.

With reference to the previously introduced example where the contextual answering program 134 extracts features such as people, animals, objects, locations, activities, actions, motions, discussion topics, discussion tones, temperatures, speeds, accelerations, and scents from the collected training data, the contextual answering program 134 trains a first model for contextual communication asking about people, animals, or objects that are present near the user, a second model for questions about one or more locations of the user, a third model for questions about activities, actions, motions, speeds, and accelerations of the user, a fourth model for discussion topics and tones of conversations involving the user or taking place near the user, and a fifth model for temperatures and scents of the user's environment.

The contextual answering program 134 may receive a configuration (step 210). Having trained the one or more contextual answering models 132, the contextual answering program 134 may now apply the one or more contextual answering models 132 to a contextual communication received by the user in real time. The contextual answering program 134 may first, however, receive a user configuration by receiving a user registration and user preferences. The user registration may be uploaded by a user, i.e., a person wearing the AR device 110 of the contextual answering system 100, and the configuration may be received by the contextual answering program 134 via the contextual answering client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, AR device 110 type, sensors 112 types, and the like. Receiving a user registration may also involve receiving or extracting data from databases such as a user's calendar, social media, message history, etc. Lastly, the contextual answering program 134 may receive a configuration of the one or more sensors 112, whether they be fixed to one or more devices (e.g., the smart device 120 or the AR device 110) or fixed within an environment in which the contextual answering system 100 is implemented.

During configuration, the contextual answering program 134 may further receive user preferences (step 210 continued). User preferences may include preferences for the manner in which the contextual answering program 134 should notify the user of one or more responses to contextual communication. User preferences may additionally include preferences for the contextual answering program 134 to notify the user via audio and/or video feedback. For example, a user may upload user preferences for notification of up to three potential responses to contextual communication via video feedback. User preferences may additionally include the option for the user to share or send collected data of the sensors 112 in response to contextual communication. For example, a user may specify the option to send a photo of the user's field of vision in response to contextual communication asking, "What are you up to?"

With reference to the previously introduced example where the contextual answering program 134 trains multiple models for various types of contextual communications, the contextual answering program 134 receives a user registration via user upload including the user's name, type of smart device 120, type of AR device 110, and type of sensors 112 including a microphone, video camera, smell sensor, speedometer, accelerometer, and thermometer located on the AR device 110. The contextual answering program 134 also receives user preferences via user upload specifying that notification of up to three responses is to be communicated to the user via video feedback on the user's AR device 110.

The contextual answering program 134 may detect an incoming contextual communication (step 212). In embodiments, the contextual answering program 134 may detect an incoming contextual communication via integration of the contextual answering client 122 with the operating system of smart device 120. In some embodiments, a user's smart device 120 may receive a text message, email, instant message, social media message, etc., and the contextual answering program 134 may utilize techniques such as natural language processing, optical character recognition, pattern/template matching, data comparison, etc. to determine that a received communication pertains to the contextual surroundings of a user. For example, the contextual answering program 134 may determine that an incoming text message asking, "Has the pizza arrived at the party yet?" is an incoming contextual communication. While the majority of incoming contextual communications may be questions or inquiries asked to a user, the contextual answering program 134 may determine that implicit questions such as statements pertaining to the context of the user may be determined to be incoming contextual communications. For example, the contextual answering program 134 may determine that an incoming email message saying, "There is no way that Steve is on time to the meeting" is an incoming contextual communication.

With reference to the previously introduced example where the user uploads a configuration, the contextual answering program 134 detects an incoming text message on the user's smart device 120 asking, "What are you guys doing? Is the pizza even there yet?"

Upon detecting an incoming contextual communication, the contextual answering program 134 may collect contextual data of a user (step 214). In embodiments, the contextual answering program 134 may begin collecting data when receiving a trigger from the user. The trigger may be user input in the form of a selection, such as a button or switch, and may further include an indication of the people, animals, objects etc. the user wishes to collect contextual data of. Alternatively, the contextual answering program 134 may continuously collect data of all people, animals, objects, etc. of the user. The contextual answering program 134 may retrieve data via user upload, databases, or the sensors 112. The contextual answering program 134 may retrieve data such as calendar data, social media data, message history data, etc. via user upload or one or more databases. In embodiments, the contextual answering program 134 may collect data via the sensors 112 as one or more microphones built into an auditorium, a camera built into a facility, a smell sensor built into the AR device 110, etc. The collected data may be related to one or more people, animals, objects, locations, activities, actions, motions, discussion topics, tones, temperatures, speeds, accelerations, scents, etc. of a user's contextual environment.

With reference to the previously introduced example where the contextual answering program 134 detects an incoming text message on the user's smart device 120 asking, "What are you guys doing? Is the pizza even there yet?", the contextual answering program 134 collects video data from video cameras, audio data from microphones, smell data from smell sensors, speed and acceleration data from speedometers and accelerometers, and temperature data from thermometers of the user's contextual environment. In addition, the contextual answering program 134 references the user's calendar and social media posts to assess the user's location and activity.

The contextual answering program 134 may extract one or more features from the collected and/or received contextual data (step 216). The contextual answering program 134 may extract one or more features from the collected and/or received data in the same manner as described with reference to step 208.

With reference to the previously introduced example where the contextual answering program 134 collects video data from video cameras, audio data from microphones, smell data from smell sensors, speed and acceleration data from speedometers and accelerometers, temperature data from thermometers, and data of the user's calendar and social media posts from databases, the contextual answering program 134 extracts the following features from the collected data:

TABLE 1

| | |
|---|---|
| people | John, Jeff, and Rachel |
| objects | playing cards |
| location | Jeff's house |
| activities | blackjack, conversation |
| motions | hitting cards |
| discussion topics | pizza, football game |
| discussion tones | cordial |
| scents | pizza |

The contextual answering program 134 may apply one or more models to the extracted features to generate one or more responses to the incoming contextual communication (step 218). As previously mentioned, such extracted features may include people, animals, objects, locations, activities, actions, motions, discussion topics, tones, temperatures, speeds, accelerations, and scents of the user's contextual environment, and the one or more contextual answering models 132 may be generated through machine learning techniques such as neural networks. In embodiments, the one or more contextual answering models 132 may be trained at initialization and/or through the use of a feedback loop to weight the features such that features shown to have a greater correlation with responding to communications based on context are weighted greater than those features that are not. Based on the extracted features and weights associated with such extracted features, the contextual answering program 134 may generate one or more responses to the contextual communication. In embodiments, the contextual answering program 134 may generate responses that mimic a user's communication tendencies. For example, if a user often responds to communication with sentence structure "[PERSON] and I are [ACTIVITY] at [LOCATION]," the contextual answering program 134 may generate responses according to the same sentence structure. In embodiments, generated responses may be additionally based on stylistic tendencies of a user's message history uploaded during configuration. For example, if a user tends to end text messages with "lol" or a certain emoji, the contextual answering program 134 may generate responses that end with "lol" or the emoji. In embodiments, the contextual answering program 134 may be configured alternatively.

With reference to the previously introduced example where the contextual answering program 134 detects an incoming text message on the user's smart device 120 asking, "What are you guys doing? Is the pizza even there yet?" and the contextual answering program 134 extracts various features of the collected data, the contextual answering program 134 applies models to generate suitable responses to the contextual communication: "We are playing blackjack, and yes the pizza is here" and "We are talking about the football game, and yes the pizza is here."

Upon the contextual answering program 134 generating one or more responses to the incoming contextual communication, the contextual answering program 134 may notify the user of the generated one or more responses (step 220). The contextual answering program 134 may convey the one or more responses to the user in the form of audio, video, text, or any other manner via the AR device 110. The contextual answering program 134 may illustrate responses via overlay within a display of the AR device 110 and the one or more subjects of responses may be identified via text, color, boxing, highlighting, flashing, symbols, etc. For example, the contextual answering program 134 may overlay response "Jeff and James are at the party" and overlay boxes around Jeff and James's faces within the display of the user's AR device 110. In addition, the responses may be conveyed audially via one or more integrated speakers. In embodiments, the contextual answering program 134 may notify the user of multiple generated responses all at one time. In other embodiments, the contextual answering program 134 may notify the user of one generated response at a time in a queue, and the contextual answering program 134 may await feedback from the user indicative of whether one or more of the responses are appropriate (i.e. eye movement or glancing towards a generated response). In embodiments, the contextual answering program 134 may respond to the incoming contextual communication with the one or more generated responses without first notifying the user. As discussed with reference to configuration, the contextual answering program 134 may notify the user of the generated one or more responses according to the user preferences of configuration. In embodiments, the contextual answering program 134 may be configured for receiving user input acknowledging, dismissing, and/or affirming that one or more responses are suitable and/or that one or more responses should be sent in response to the incoming contextual communication.

With reference to the previously introduced example where the contextual answering program 134 generates suitable responses to the contextual communication: "We are playing blackjack, and yes the pizza is here" and "We are talking about the football game, and yes the pizza is here," the contextual answering program 134 notifies the user of both responses with visual overlay on the user's AR device 110.

The contextual answering program 134 may evaluate and modify the contextual answering models 132 (step 222). In the example embodiment, the contextual answering program 134 may verify whether the one or more responses were appropriately generated in order to provide a feedback loop for modifying the contextual answering models 132. In embodiments, the feedback loop may simply provide a means for a user to indicate whether the generated one or more responses were appropriate and/or should be sent in response to the received contextual communication. The feedback loop indication may be triggered via a toggle switch, button, slider, etc. that may be selected by the user manually by hand using a button/touchscreen/etc., by voice, by eye movement, and the like. Based on the contextual answering program 134 appropriately or inappropriately generating a response, the contextual answering program 134 may modify the contextual answering models 132. In other embodiments, the contextual answering program 134 may infer or deduce whether the one or more responses were correctly generated. For example, the contextual answering program 134 may interpret user dialogue via natural language processing to determine whether the generated responses are appropriate. For example, if the user says, "We aren't doing any of these" or other expressions indicative of a user's context not appropriately being identified, the contextual answering program 134 may infer that the generated responses were inappropriately generated and modify the contextual answering models 132 accordingly. Based on feedback received in the above or any other manners, the contextual answering program 134 may then modify the contextual answering models 132 to more accurately respond to communications based on context. In embodiments, if the contextual answering program 134 responds to a contextual communication and the contextual environment of the user subsequently changes such that the sent response is no longer accurate or the sent response requires an update, the contextual answering program 134 may collect additional contextual data, extract features from the additional contextual data, apply one or more models to generate one or more responses, and notify the user of the updated one or more responses. For example, if the contextual answering program 134 receives contextual communication "Who is at the party?" at 1:30 pm and the contextual answering program 134 accurately responds with, "Brian and Charlie are at the party", but David subsequently arrives at the party at 1:45 pm, the contextual answering program 134 may prompt the user with the additional response to the original contextual communication, "David is now also at the party."

With reference to the previously introduced example where the contextual answering program 134 notifies the user of the generated responses with visual overlay on the user's AR device 110, the user says, "Please send the first response" and the contextual answering program 134 sends, "We are playing blackjack, and yes the pizza is here" as a text message response. The contextual answering program 134 additionally modifies the contextual answering models 132 accordingly.

Figure 3:
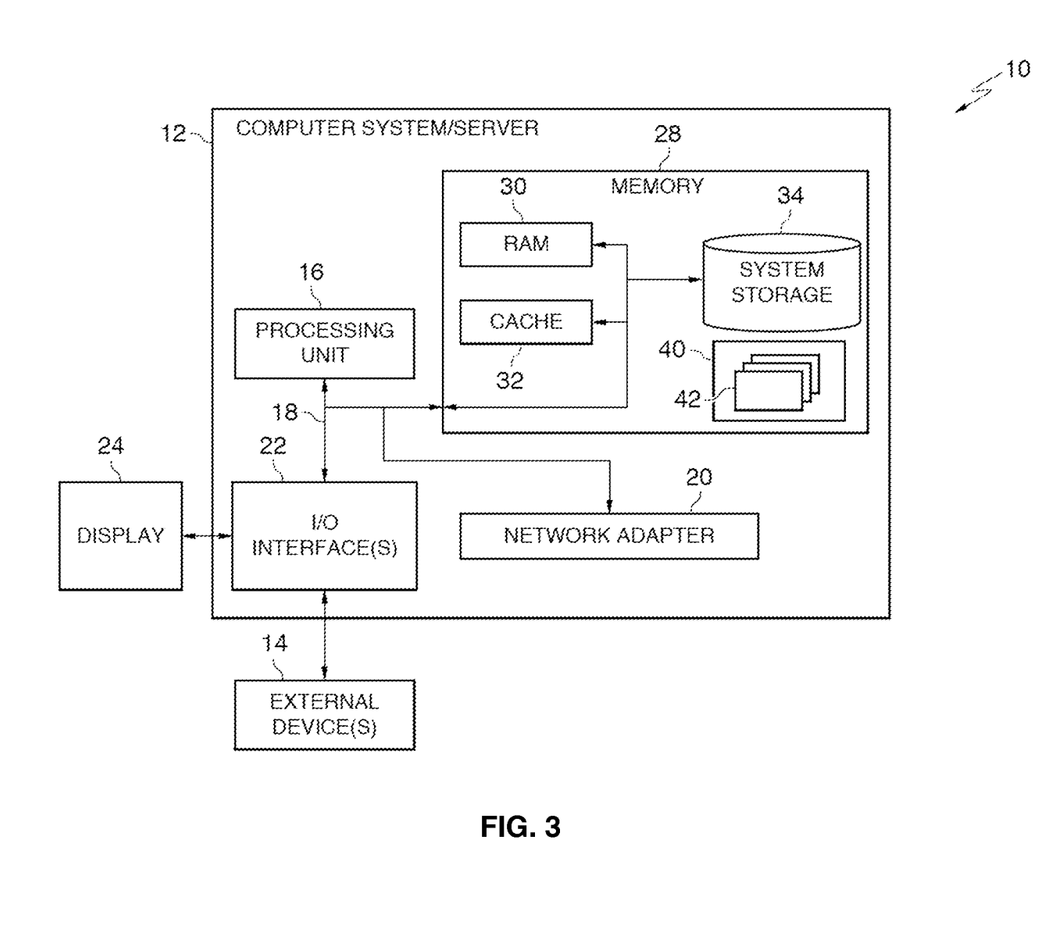
FIG. 3 depicts an exemplary block diagram depicting the hardware components of the contextual answering system 100 of FIG. 1, in accordance with the exemplary embodiments.

FIG. 3 depicts a block diagram of devices within the contextual answering system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
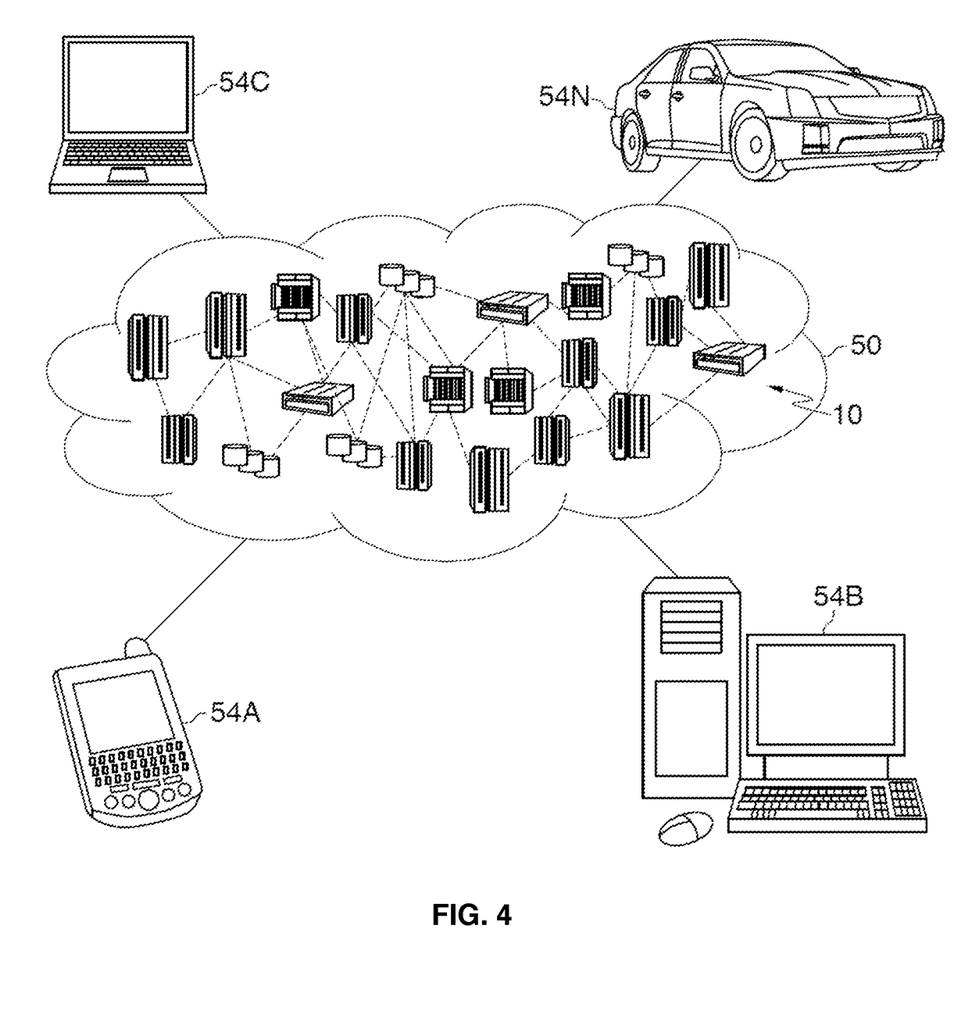
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
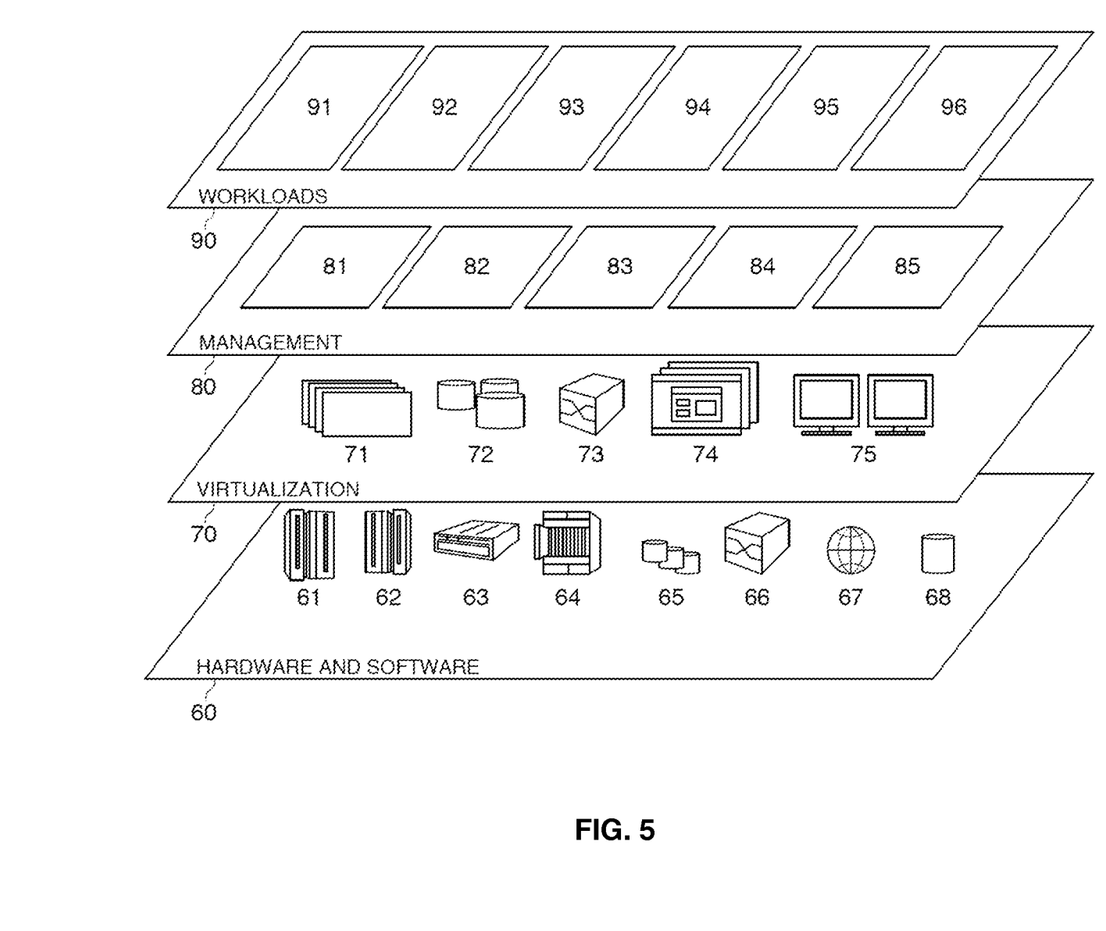
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual communication answering 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for responding to contextual communication, the method comprising:
 a user receiving a current contextual communication;
 collecting data relating to a current environment of the user;
 extracting one or more features from the collected data;
 determining existence of a previously generated user response similar to said current contextual communication by analyzing said extracted one or more features;
 determining when at least one of said features from said collected data provides an environment that was similar to said current environment;
 analyzing said previously generated user response(s) with similar contextual and/or environmental similarities with respect to said currently received user contextual communication;
 generating one or more responses to said currently received contextual communication based on said analysis by using one or more models.

2. The method of claim 1, further comprising:
 sending the one or more responses in response to the received contextual communication.

3. The method of claim 1, further comprising:
 notifying the user of the generated one or more responses.

4. The method of claim 1, wherein the one or more models correlate the one or more features; wherein said models are enabled to generate one or more appropriate responses to the received contextual communication.

5. The method of claim 1, further comprising:
 receiving feedback indicative of whether the generated one or more responses were appropriate or should be sent in response to the received contextual communication; and
 adjusting the one or more models based on the received feedback.

6. The method of claim 1, further comprising:
 collecting training data, wherein said training data at least includes user's previous responses;
 extracting training features from the training data; and
 training one or more models based on the extracted training features.

7. The method of claim 1, wherein the one or more features include people, animals, objects, locations, activities, actions, motions, discussion topics, tones, temperatures, speeds, accelerations, and scents.

8. A computer program product for responding to contextual communication, the computer program product comprising:
 one or more non-transitory computer-readable storage media and program instructions stored on the one or more non-transitory computer-readable storage media capable of performing a method, the method comprising:
 a user receiving a current contextual communication;
 collecting data relating to a current environment of the user;
 extracting one or more features from the collected data
 determining existence of a previously generated user response similar to said current contextual communication by analyzing said extracted one or more features;
 determining when at least one of said features from said collected data provides an environment that was similar to said current environment;
 analyzing said previously generated user response(s) with similar contextual and/or environmental similarities with respect to said currently received user contextual communication;
 generating one or more responses to said currently received contextual communication based on said analysis by using one or more models.

9. The computer program product of claim 8, further comprising:
 sending the one or more responses in response to the received contextual communication.

10. The computer program product of claim 8, further comprising:
 notifying the user of the generated one or more responses.

11. The computer program product of claim 8, wherein the one or more models correlate the one or more features, wherein said models are enabled to generate one or more appropriate responses to the received contextual communication.

12. The computer program product of claim 8, further comprising:
 receiving feedback indicative of whether the generated one or more responses were appropriate or should be sent in response to the received contextual communication; and adjusting the one or more models based on the received feedback.

13. The computer program product of claim 8, further comprising:
 collecting training data, wherein said training data at least includes user's previous responses;
 extracting training features from the training data; and
 training one or more models based on the extracted training features.

14. The computer program product of claim 8, wherein the one or more features include people, animals, objects, locations, activities, actions, motions, discussion topics, tones, temperatures, speeds, accelerations, and scents.

15. A computer system for responding to contextual communication, the computer system comprising:
 one or more computer processors, one or more computer-readable storage media, and program instructions stored on the one or more of the computer-readable storage media for execution by at least one of the one or more processors capable of performing a method, the method comprising:
 a user receiving a current contextual communication;
 collecting data relating to a current environment of the user;
 extracting one or more features from the collected data
 determining existence of a previously generated user response similar to said current contextual communication by analyzing said extracted one or more features;
 determining when at least one of said features from said collected data provides an environment that was similar to said current environment;
 analyzing said previously generated user response(s) with similar contextual and/or environmental similarities with respect to said currently received user contextual communication;
 generating one or more responses to said currently received contextual communication based on said analysis by using one or more models.

16. The computer system of claim 15, further comprising:
 sending the one or more responses in response to the received contextual communication.

17. The computer system of claim 15, further comprising: notifying the user of the generated one or more responses.

18. The computer system of claim 15, wherein the one or more models correlate the one or more features, wherein said models are enabled to generate one or more appropriate responses to the received contextual communication.

19. The computer system of claim 15, further comprising:
receiving feedback indicative of whether the generated one or more responses were appropriate or should be sent in response to the received contextual communication; and adjusting the one or more models based on the received feedback.

20. The computer system of claim 15, further comprising:
collecting training data, wherein said training data at least includes user's previous responses;
extracting training features from the training data; and
training one or more models based on the extracted training features.

\* \* \* \* \*